United States Patent [19]

Arena et al.

[11] Patent Number: 4,706,975
[45] Date of Patent: Nov. 17, 1987

[54] DISABLED SHOPPING CART ATTACHMENT

[76] Inventors: Christopher L. Arena, 11632 Stephanie, Garden Grove, Calif. 92640; Robert L. Prior, 13741 Malena, Tustin, Calif. 92680

[21] Appl. No.: 871,794

[22] Filed: Jun. 9, 1986

[51] Int. Cl.$^4$ .............................................. B62B 5/00
[52] U.S. Cl. ........................... 280/33.99 A; 272/70.3; 280/33.99 C; 280/87.02 W; 280/DIG. 4
[58] Field of Search ................ 280/33.99 A, 33.99 C, 280/33.99 R, 33.99 S, 33.99 H, 289 W, 289 C, 242 W, 242 C, 87.02 R, 87.02 W, 47.13 R, 63, DIG. 4, 79.2; 272/70.3; 297/5, 6

[56] References Cited

U.S. PATENT DOCUMENTS

| | | | |
|---|---|---|---|
| 2,077,569 | 4/1937 | Kish | 297/5 |
| 3,112,121 | 11/1963 | Hummer | 280/33.99 C |
| 3,501,164 | 3/1970 | Peterson | 280/33.99 C |
| 3,834,726 | 9/1974 | Hobza | 280/33.99 A |
| 4,484,755 | 11/1984 | Houston | 280/33.99 A |
| 4,555,124 | 11/1985 | Millington | 280/33.99 A |

*Primary Examiner*—David M. Mitchell
*Attorney, Agent, or Firm*—Stetina & Brunda

[57] ABSTRACT

A shopping attachment is disclosed for direct connection to a conventional shopping cart to allow the cart to be safely utilized by and serve as a support for disabled persons. The attachment comprises a pair of spaced tubular members attachable to the shopping cart. Each of the tubular members has a wheel mounted to a lower portion thereof. The tubular members are formed to have a horizontal support section for supporting a portion of the weight of the user. The horizontal support section preferably extends forward of the wheels attached to the tubular members to provide greater support and stability to the user. A braking mechanism is disposed in engageable frictional contact with the wheel and a braking mechanism handle is provided for regulating the operation of the braking mechanism. Breaking mechanism linkage is provided to connect the braking mechanism with the actuator handle such that said braking mechanism is normally engaged to the wheel to oppose movement of the wheel, and released from engagement upon movement of the actuator handle.

9 Claims, 2 Drawing Figures

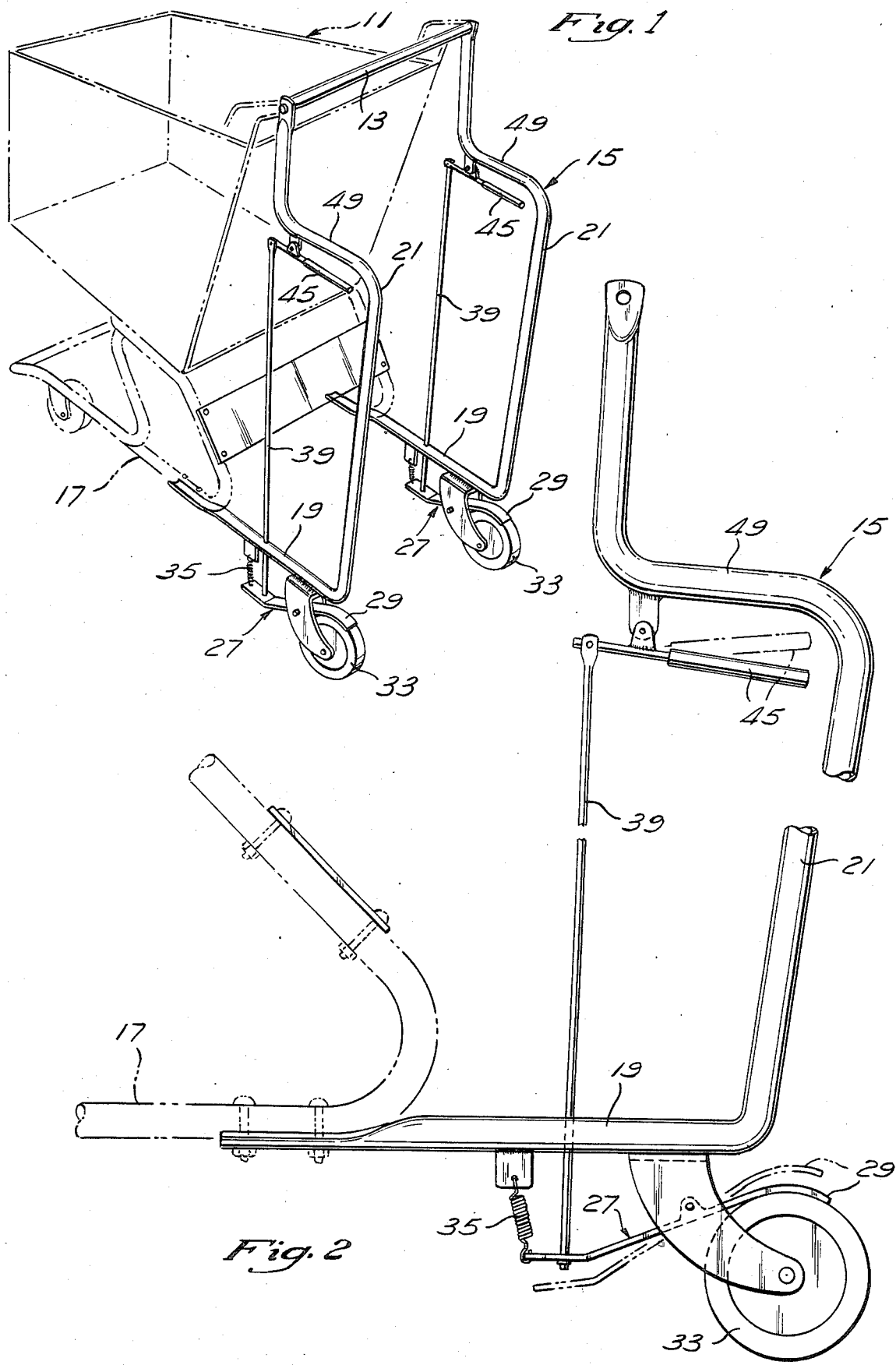

DISABLED SHOPPING CART ATTACHMENT

BACKGROUND OF THE INVENTION

The present invention relates to a shopping cart attachment and, more particularly, to apparatus for connection to a conventional shopping cart to allow the shopping cart to be used by elderly, disabled and/or mobility impaired persons who otherwise use a walker and/or crutches.

As the number of older Americans increases there exists a growing need to provide mechanisms that will allow those older Americans, as well as handicapped individuals, to perform basic and everyday shopping tasks. Though some elderly, disabled or partially disabled persons can have others do their shopping for them, there is a large number of individuals who must or prefer to do their own shopping chores.

A number of different types of constructions have been proposed for incorporating braking mechanisms into shopping carts for use by elderly, disabled persons. Those devices typically include the provision of a displaceable bar adjacent the shopping cart handle. In use, the bar is squeezed toward the shopping cart handle to release the braking mechanism. Such contemporary devices typically rely upon the cart handle to serve as the supporting surface for the disabled user. Because the cart handles are typically disposed above a convenient support level, the ability of such a device to provide such support is substantially limited. Moreover, the direction of the cart handle, though convenient for pushing, is less useful to support the weight of the user.

Accordingly, there is a need for a shopping cart attachment for elderly or disabled individuals that provides a more conveniently located support surface disposed apart from a cart handle, and with a braking mechanism actuator disposed adjacent the support surface.

SUMMARY OF INVENTION

The shopping cart attachment of the present invention is disclosed for direct connection to a conventional shopping cart to allow the cart to be safely utilized by and serve as a support for disabled persons. The attachment comprises a pair of spaced tubular members attachable to the shopping cart, each of the tubular members having a wheel and brake mounted to a lower portion thereof. The tubular members are formed to have a horizontal support section for supporting a portion of the weight of the user. A braking mechanism is disposed in engageable frictional contact with each wheel and a braking mechanism handle is provided for regulating the operation of each braking mechanism, thus allowing either brake to be relesed separately to aid in directional control of the cart or both simultaneously for free movement of the cart. A braking mechanism linkage is provided to connect the braking mechanism with the actuator handle such that said braking mechanism is normally engaged to the wheel to oppose movement of the wheel, and is released from engagement upon movement of the actuator handle.

Each of the tubular members is connected to the cart along the lower portion of the cart and at the cart handle. The horizontal support section is disposed below and substantially perpendicular to the cart handle. The braking mechanism is preferably formed as an S-shaped brake shoe that cooperates with the braking mechanism linkage and a spring to normally dispose the brake shoe in frinctional engagement with the wheels.

BRIEF DESCRIPTION OF THE DRAWINGS

FIG. 1 is perspective view of one embodiment of the present shopping cart attachment connected to a conventional shopping cart; and FIG. 2 is the side view of a portion of the shopping cart attachment illustrated in FIG. 1.

DETAILED DESCRIPTION OF THE PRESENTLY PREFERRED BODYMENT

FIG. 1 illustrates a shopping cart attachment 15 formed in accordance with the present invention, shown connected to a conventional shopping cart which enables the shopping cart to be utilized to support and elderly, disabled, partially disabled and/or handicapped user (i.e. those individuals having difficulty in walking and/or mobility) hereinafter generally referred to as disabled user and/or user. As shown therein the conventional shopping cart 11 is provided with a shopping cart handle 13. The shopping cart attachment 15 is preferably formed as two separate, generally parallel tubular members 21, each of which is attached to the cart 11 along shopping cart lower portion 17 and shopping cart handle 13. The shopping cart attachment 15 is provided with wheels 33 mounted on lower portion 19 of the shopping cart attachment 15. Lower portion 19 serves to extend the wheel base of the shopping cart such that the user may apply his or her weight to the attachment 15 at a point generally forward of the rear wheels, thereby providing more stable support then would normally be possible with conventional shopping carts. The distance that the users weight is supported forward of the rear wheels of the attachment may be varied as to desired and in accordance with the particular application. It is to be understood that the attachment 15 can be mounted to the shopping cart in other ways and without the need to detach the cart's rear wheels.

Wheels 17 are mounted upon lower portions 19 of the tubular members 19. Each of the members 21 is further provided with a braking mechanism 27. The braking mechanism is formed generally of S-shaped brake shoes 29 adapted to normally provide frictional braking against wheels 33 in response to the action of springs 35. Linking members 39 connect the brake shoes 29 to actuator handles 45 disposed adjacent horizontal support section 49.

In use, a disabled user may support himself upon the surfaces of horizontal sections 49, with the braking mechanisms preventing the shopping cart from moving. When user grasps the handles 45 and draws the handles toward the support section 49 the braking mechanisms 27 release and the cart may be freely moved about. Upon release of the handles 45 the braking mechanisms 27 again engage the wheels 33 and the horizontal support section 49 members may again be used to facilitate stationary support of the user. Further, actuation of each of the braking mechanisms may be facilitated independently, thus aiding in directional control of the cart for the user.

It is anticipated that various additions and modifications of the invention may be made without departing from the spirit and scope of the invention. For example, various types of braking machanisms and actuator handles may be implemented within the scope of the present invention. Also, different style support bars having different shapes may be utilized. Accordingly, and other additions and modifications of the invention may be made within the scope and teachings of the present invention.

What is claimed is:

1. A shopping cart attachment apparatus for direct connection to a shopping cart having wheels and a cart handle in order to allow the cart to be safely used by, and serve as a support for, mobility impaired persons, the apparatus comprising:
   a pair of spaced tubular members, each of said members rigidly attached to the shopping cart at a first position which normally attaches a rear wheel of the shopping cart in substitution for that rear wheel and at a second position at an upper region of the shopping cart, each of said members having a wheel mounted to a lower portion thereof, each of said members having a generally-horizontal support section for supporting a portion of the weight of the user;
   a braking mechanism disposed adjacent each of said wheels for holding the cart in the place; and
   a braking mechanism actuator handle disposed adjacent at least one of said horizontal support sections for regulating the operation of said braking mechanism.

2. The attachment as recited in claim 1 further comprising:
   a braking mechanism linkage, connecting said braking mechanism to said actuator handle, operating in a manner such that said braking mechanism is normally engaged to said wheels to oppose movement of said wheels, and is released from said engagement upon movement of said actuator handle.

3. The attachment as recited in claim 1 wherein said horizontal support section extends forward of the wheels attached to the lower portion said tubular members.

4. The attachment as recited in claim 1 wherein each of said members is connected to the cart at the cart handle.

5. The attachment as recited in claim 1 wherein said horizontal support section is disposed below and substantially perpendicular to the cart handle.

6. The attachment as recited in claim 2 wherein said braking mechanism comprises an S-shaped brake shoe said brake shoe cooperating with said linkage such that said brake shoe is normally disposed in frictional contact with said wheel.

7. The attachment as recited in claim 1 wherein said tubular members are separately attachable to the shopping cart.

8. An apparatus for direct connection to a shopping cart to allow the shopping cart to be safely used by, and serve as a support for, mobility-impaired persons, the apparatus comprising:
   a pair of spaced-apart generally tubular members, rigidly connected to the shopping cart in substitution for the rear wheels of the shopping cart, and extending from the shopping cart;
   a wheel attached to a lower portion of each of the members for supporting the members on the ground; and
   a generally horizontal support section formed in each of the members for supporting substantial portion of the weight of the user said support sections extending forward of the attached wheel.

9. An apparatus for use in shopping by mobility-impaired persons comprising:
   a partially wheeled shopping cart comprising a frame, a basket, a rearwardly disposed handle, and only one frontwardly-disposed pair of wheels,
   a pair of spaced-apart tubular members, each of said members rigidly attached to the rear of the shopping cart frame, each having a wheel mounted to a lower portion thereof, and each having a generally horizontal support section for supporting a portion of the weight of the user;
   a braking mechanism disposed adjacent each of said wheels for holding the cart in place; and
   a braking mechanism actuator handle disposed adjacent at least one of said horizontal support bars for regulating the operation of said braking mechanism;
   wherein the weight of the entire apparatus and of any items emplaced within the shopping cart basket and of any weight emplaced upon the support section by the user is borne upon four wheels only of which two are frontwardly-disposed on the shopping cart and one is upon each of the pair of tubular-members attached to the rear of shopping cart frame.

* * * * *